J. McC. COLEMAN.
CAR CONSTRUCTION.
APPLICATION FILED JULY 28, 1911.

1,026,945.

Patented May 21, 1912.

2 SHEETS—SHEET 1.

Witnesses

Inventor
J. M. Coleman,
By
Attorneys

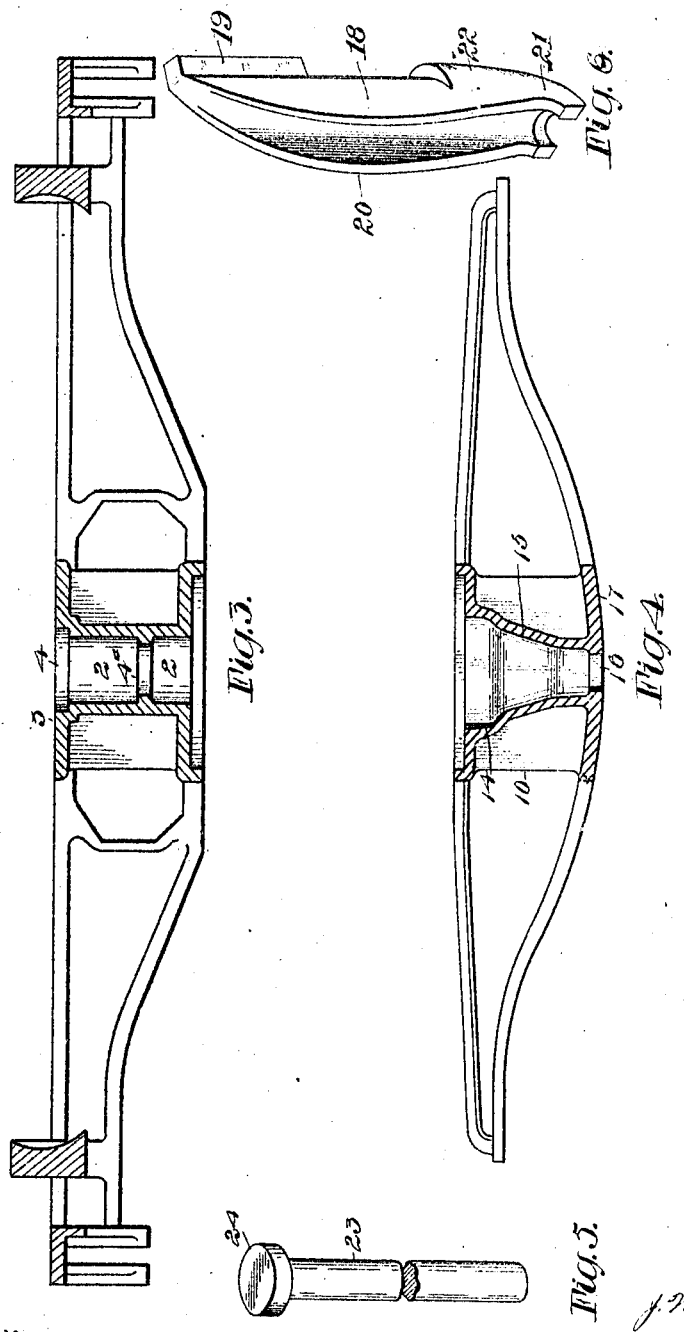

UNITED STATES PATENT OFFICE.

JAMES McCUTCHEON COLEMAN, OF WESTMOUNT, QUEBEC, CANADA.

CAR CONSTRUCTION.

1,026,945.   Specification of Letters Patent.   Patented May 21, 1912.

Application filed July 28, 1911. Serial No. 641,075.

*To all whom it may concern:*

Be it known that I, JAMES MCCUTCHEON COLEMAN, a citizen of the United States of America, and resident of 356 Olivier avenue, in the city of Westmount, Province of Quebec, Dominion of Canada, have invented certain new and useful Improvements in Car Construction; and I do hereby declare that the following is a full, clear, and exact description of the same.

The invention relates to improvements in car construction as described in the present specification and illustrated in the accompanying drawings that form part of the same.

The invention consists essentially in the novel means employed for tying trucks to the body of the car without disturbing the flexibility of said body in relation to said trucks.

The objects of the invention are to devise a construction of car, in which the body will not readily leave the trucks in the event of an accident, and thus avoid telescoping and other dangerous happenings in the event of disaster and consequently saving life and property and generally to provide a thoroughly mechanical and flexible joint between the body bolster and the truck bolster.

Figure 1:
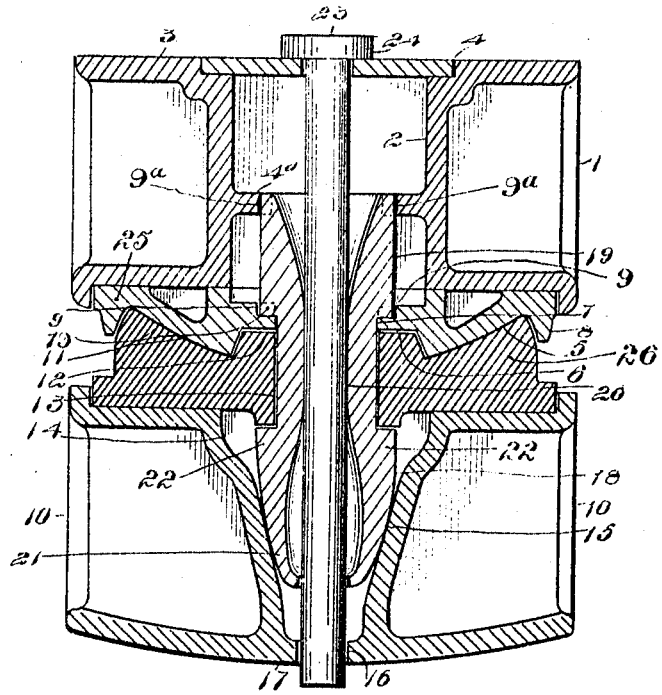
Figure 2:
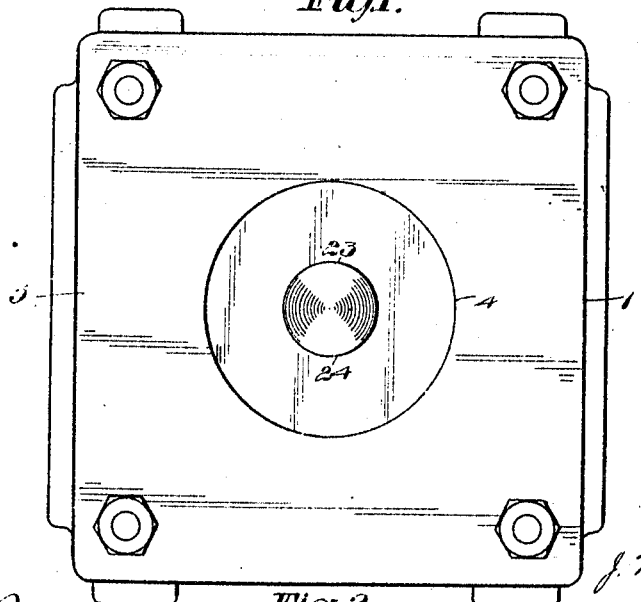

In the drawings, Figure 1 is a vertical sectional view, showing the joint in the center of the body and truck bolsters. Fig. 2 is a plan view of the same from above. Fig. 3 is a longitudinal mid-sectional view of the body bolster. Fig. 4 is a longitudinal mid-sectional view of the truck bolster. Fig. 5 is a perspective detail of the king pin. Fig. 6 is a perspective detail of a tie piece.

Like numerals of reference indicate corresponding parts in each figure.

Referring to the drawings, 1 is the body bolster, which is secured to the underside of the car body as customary, formed at the joint center with the recess 2 in the upper side 3, being further recessed at 4 around the recess 2, and having the upper and lower angular ribs 4ª extending outwardly from the wall of said recess 2.

25 is a bearing plate formed integral with or rigidly secured to bolster 1 and formed with the circular convex surface 5 centrally recessed at 6 around the edge of the center pin hole 7 leading through the bed of said recess and disposed centrally through the plate.

8 is a downwardly extending flange encircling the convex surface at the outside thereof and serving as a dust guard.

9 are key slots or notches formed in the upper surface of the plate 25 at the edge of the pin hole 7 and 9ª are key slots or notches formed in the inner edge of the rib 4ª.

10 is the truck bolster arranged as usual in alinement with the body bolster 1, and having integral with or rigidly secured thereto a bearing plate 26 formed on the upper side thereof with the concaved surface 11 corresponding to and meeting the convex surface 5 and surrounding a circular boss 12. Said boss extends into the recess 6 and is provided with a central pin hole therethrough corresponding to the pin hole 7. Immediately below the boss 12, the bolster 10 is formed with a circular recess 14, leading into the reduced converging recess 15, from the latter of which leads the pin hole 16 through the bottom 17 of the bolster.

18 are tie pieces each having a vertical flange 19 adapted to extend at one end into a notch 9ª and at the other end into a notch 9, and a bulging or bellying shank 20 terminating at the lower end in the tail 21 adapted to bear on the king pin.

22 is a flange whose upper edge extends under the bottom of the boss 12 though not bearing thereon.

23 is the king pin inserted between the keys 18 and the pin hole 16 and held above the upper side of the body bolster 1 by the punched ring 24, said punched ring resting in the recess 4, thereby providing easy access to the parts by its removal. It will be thus seen that with the king pin 23 in position the body and the truck bolsters are irremovably tied together by the keys 18, as the flanges 19 engage the upper surface of the plate 25 while the flanges 22 extend under the plate 26, though not close enough to said plate to produce a binding or grinding effect. The tails 21 bear on the pin, thus, in the swinging of the truck, the keys will remain in a rigid position, being ensconced in the key slots 9 and 9ª.

In positioning the parts the keys are first passed through the holes 7 and 13 and the king pin is then dropped into position, thereby forcing the keys outwardly until the flanges 19 engage the key slots or notches 9 and 9ª and the flanges 22 engage under the plate 26. In the swinging of the truck the body bolster, bearing plate 25, keys and king pin move together. The convex and corresponding concave surface accommodating the movement while the tail pieces of the keys have a little movement within the recess 15 and within the hole 13.

It is to be understood that the bearing plates 25 and 26 may be separate elements suitably secured to their respective bolsters, or they may be formed integral with the bolsters.

Some changes may be made in the arrangement and construction of the parts without departing from the spirit of the invention so long as such changes are not greater than the scope of the claims for novelty following.

What I claim as my invention is:

1. In car construction, a joint between the car body and the truck formed by the meeting center bearing parts of bolster members, locked together by expanding tie members engaging upper and under surfaces of said bolster members respectively.

2. In car construction, a center bearing comprising meeting convex and concave parts, a plurality of flanged tie members inserted centrally therethrough, and a king pin inserted between said tie members, to expand same into engagement with said parts.

3. In car construction, a center bearing comprising meeting convex and concave parts, a plurality of flanged tie members inserted centrally therethrough, and a king pin inserted between said tie members whereby said tie members engage at their upper ends an upper surface of said convex part and at their lower ends an under surface of said concave part.

4. In a device of the class described, in combination, a car body, a bolster rigidly secured to said car body and having a center bearing portion centrally recessed and a pin-hole through the lower side thereof, said lower side being convexed and centrally recessed around said pin-hole, a truck, a bolster rigidly secured to said truck having a center bearing portion with an upper side concaved in dish shape around a central upwardly projecting boss and a pin hole through said boss and the lower side of the bolster, a plurality of tie members having flanged heads and flanges toward the lower end thereof, said head flanges engaging said body bolster and said lower flanges extending under the lower surfaces in said truck bolster and a pin extending through said pin holes between the said tie members.

5. In a device of the class described, in combination, a car body, a bolster rigidly secured to said car body having a central bearing portion recessed centrally from the upper side thereof and centrally from the under side and a pin-hole through the bed of said recesses, said underside being convexed around said lower recess and flanged around said convexed surface, a truck bolster having a central bearing portion with an upper surface correspondingly concaved to the convexed surface of said body bolster and a corresponding central boss extending into said underside recess in the body bolster and a central recess under said boss leading to a reduced recess in the lower part of said truck bolster, said recesses forming enlargements of the pin-hole therethrough, a punched ring covering in the upper recess in the body bolster, a king pin extending through said punched ring and through the pin holes in said bolsters and keys rigidly held to said body bolster and having flanged heads engaging an upper surface of the body bolster and intermediate flanges extending under the lower surface of the truck bolster and tails engaging said pin.

6. In car construction, the combination with the body and truck bolsters, of center bearings rigid with said bolsters, a king pin, and means engaged by said king pin and engaging upper and lower members for flexibly tying said bolsters together.

7. In car construction, the combination with the body and truck bolsters, of center bearings rigid with said bolsters, a king pin and means for tying said bolsters together adapted to be brought into engagement with the upper and lower members by the insertion of said king pin.

Signed at the city of Montreal, Province of Quebec, Canada, this fourteenth day of July, 1911.

JAMES McCUTCHEON COLEMAN.

Witnesses:
P. SHEE,
LEW A. PIGEON.